Patented July 29, 1947

2,424,691

UNITED STATES PATENT OFFICE 2,424,691

INTERPOLYMERIZATION OF THIOPHENE WITH VINYL ESTERS OF ORGANIC FATTY ACIDS

Rowland C. Hansford, Woodbury, N. J., assignor to Socony-Vacuum Oil Company, Incorporated, a corporation of New York No Drawing. Application July 8, 1944,
Serial No. 544,149

6 Claims. (Cl. 260—86)

This invention relates to the interpolymerization of thiophene with vinyl compounds, and is more particularly concerned with the method of preparing valuable thermoplastic rubber-like masses through the catalytic interpolymerization of thiophene with vinyl compounds.

Polymerization reactions are well known and connote condensation reactions involving molecules of unsaturated organic compounds. Thus, it is well known in the art, to effect a union between and/or among molecules of an unsaturated organic compound to produce a product, called a homopolymer, the molecular weight of which, is an even multiple of the molecular weight of the original compound. The operation is called homopolymerization and the conditions of temperature, pressure, etc., are called homopolymerizing conditions. The union may also take place between and/or among molecules of two or more dissimilar unsaturated organic compounds, to produce products that represent additions of the two or more unsaturated organic compounds. The products thus produced are referred to as interpolymers, as distinguished from the products obtained when molecules of an unsaturated organic compound condense with themselves, and the operation is called interpolymerization.

As is well known to those familiar with the art, homopolymerization and interpolymerization reactions are generally carried out in the presence of substances or of mixtures of substances that promote the homopolymerization or interpolymerization reaction. These substances have been termed homopolymerization or interpolymerization catalysts, depending upon the type of reaction they catalyze, and among the most widely used, are phosphoric acid, sulfuric acid, anhydrous hydrogen fluoride, metal halides and boron trifluoride.

It is also well known in the art, to polymerize vinyl acetate and/or vinyl halides to produce a variety of valuable synthetic resins known broadly as vinyl resins, and of valuable synthetic fibers generally referred to as synthetic fibers of the vinyl type. In contrast to other well known synthetic resins and fibers which possess thermosetting properties and become permanently infusible under the influence of heat, most of these vinyl products possess thermoplastic properties. Although sufficiently rigid at room temperatures, these products can be remolded when desired, through the application of heat and pressure.

I have now found that thiophene can be interpolymerized with vinyl esters to produce valuable synthetic products.

Accordingly, it is an object of the present invention to provide a method of effecting the interpolymerization of thiophene with vinyl esters. Another object is to afford a method of preparing valuable synthetic products. A more specific object is to provide a method capable of carrying out the aforementioned objects by effecting the interpolymerization of thiophene with vinyl esters in the presence of boron trifluoride. Other objects and advantages of the present invention will become apparent to those skilled in the art from the following description.

Broadly stated, my invention provides a method which comprises contacting thiophene with a vinyl ester, in the presence of boron trifluoride.

The vinyl compounds to be used in the method of the present invention are the vinyl esters such as vinyl acetate, vinyl propionate, and the like. I especially prefer to use vinyl acetate. These vinyl compounds may be obtained, for example and as is well known in the art, through the reaction of anhydrous fatty acids with acetylene. There appears to be nothing that is critical in the relative amounts of thiophene and vinyl esters used, and ordinarily, a charge comprising equal volumes of thiophene and of a vinyl ester is satisfactory.

The amounts of boron trifluoride to be employed are small. By way of non-limiting example, I have found that a charge containing between about 1% and about 5% of boron trifluoride, based on the weight of the reactants, will react spontaneously at room temperature. Larger amounts may be used if desired, although no advantages seem to result therefrom. The boron trifluoride may be used conveniently, in the form of a boron fluoride-ethyl etherate containing about 45% by weight, of boron trifluoride.

Generally speaking, the interpolymerization will occur readily at room temperatures, for example, at temperatures of 15–30° C., and ordinarily, temperatures around 25° C. to 30° C. are to be preferred.

The products obtained are rubber-like masses containing appreciable amounts of sulfur. The products, after washing, drying and cooling, are semisolid resilient masses not unlike crude rubber. The washed and dried products possess thermoplastic properties, and can be worked, pressed and extruded into any desired shape or form. They are insoluble in most organic solvents. Generally speaking, the products of my invention may be used as a rubber substitute in the manufacture of molded and extruded articles, as well as an impregnating agent for fabrics, a laminating agent for the manufacture of composite structures, etc.

Without any intended restriction of the scope of the present invention, the following examples are submitted as illustrative of the results obtainable in accordance with the method of my invention:

*Example 1*

Equal volumes of thiophene and of vinyl acetate were mixed with about 2% by weight, of boron trifluoride in the form of boron trifluoride-ethyl etherate containing about 45% by weight, of boron trifluoride. After about five minutes at room temperatures (about 30° C.), the reaction occurred spontaneously with moderate violence and moderate heat evolution. The reaction product was a rubber-like resilient mass. The product was washed with water and dried at 100° C. for one hour. The dried product at 100° C. had the appearance of a dark-brown sticky liquid. On cooling to room temperature (30° C.), it became a semi-solid resilient mass not unlike crude rubber. The product was analyzed and found to contain 22.0% by weight, of sulfur.

*Example 2*

Equal volumes of thiophene and of vinyl acetate were mixed with about 2% by weight, of boron trifluoride in the form of a boron trifluoride-ethyl etherate containing about 45% by weight, of boron trifluoride. No reaction occurred when the mixture was cooled to 0° C. Upon raising the temperature to 25–30° C. the reaction occurred as described in Example 1. However, in this instance, a water bath was provided to dissipate the heat of reaction. The reaction product before and after washing, drying and cooling, was similar in every respect to that obtained in Example 1. Upon analysis, it was found to contain 21.7% by weight of sulfur.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. The method which comprises reacting substantially equal volumes of thiophene and a vinyl ester selected from the group consisting of vinyl acetate and vinyl propionate, in the presence of boron trifluoride.

2. The method which comprises reacting substantially equal volumes of thiophene and vinyl acetate, in the presence of boron trifluoride.

3. The method which comprises reacting substantially equal volumes of thiophene and vinyl propionate, in the presence of boron trifluoride.

4. The product obtained by reacting substantially equal volumes of thiophene and a vinyl ester selected from the group consisting of vinyl acetate and vinyl propionate, in the presence of boron trifluoride.

5. The product obtained by reacting substantially equal volumes of thiophene and vinyl acetate, in the presence of boron trifluoride.

6. The product obtained by reacting substantially equal volumes of thiophene and vinyl propionate, in the presence of boron trifluoride.

ROWLAND C. HANSFORD.

REFERENCES CITED

The following references are of record in the file of this patent:

UNITED STATES PATENTS

| Number | Name | Date |
|---|---|---|
| 2,020,714 | Wulff | Nov. 12, 1935 |
| 2,310,780 | Hanford | Feb. 9, 1943 |

OTHER REFERENCES

Fredenhagen Zeit. Physik. Chem. A–164, page 190 (1933).